United States Patent
Ye et al.

(10) Patent No.: US 8,441,438 B2
(45) Date of Patent: May 14, 2013

(54) 3D POINTING DEVICE AND METHOD FOR COMPENSATING MOVEMENT THEREOF

(75) Inventors: Zhou Ye, Foster City, CA (US);
Chin-Lung Li, Taoyuan County (TW);
Shun-Nan Liou, Kaohsiung (TW)

(73) Assignee: Cywee Group Limited, Tortola (VG)

( * ) Notice: Subject to any disclaimer, the term of this patent is extended or adjusted under 35 U.S.C. 154(b) by 218 days.

(21) Appl. No.: 12/943,934

(22) Filed: Nov. 11, 2010

(65) Prior Publication Data

US 2011/0163950 A1 Jul. 7, 2011

Related U.S. Application Data

(60) Provisional application No. 61/292,558, filed on Jan. 6, 2010.

(51) Int. Cl.
*G09G 5/00* (2006.01)

(52) U.S. Cl.
USPC .......................................................... 345/156

(58) Field of Classification Search .................. None
See application file for complete search history.

(56) References Cited

U.S. PATENT DOCUMENTS

| | | | |
|---|---|---|---|
| 5,138,154 A | 8/1992 | Hotelling | |
| 5,440,326 A | 8/1995 | Quinn | |
| 5,898,421 A | 4/1999 | Quinn | |
| 6,061,611 A * | 5/2000 | Whitmore | 701/4 |
| 6,993,451 B2 * | 1/2006 | Chang et al. | 702/153 |
| 7,158,118 B2 | 1/2007 | Liberty | |
| 7,236,156 B2 | 6/2007 | Liberty et al. | |
| 7,239,301 B2 | 7/2007 | Liberty et al. | |
| 7,262,760 B2 | 8/2007 | Liberty | |
| 7,414,611 B2 | 8/2008 | Liberty | |
| 7,489,298 B2 | 2/2009 | Liberty et al. | |
| 7,535,456 B2 | 5/2009 | Liberty et al. | |
| 7,774,155 B2 * | 8/2010 | Sato et al. | 702/127 |
| 7,817,134 B2 * | 10/2010 | Huang et al. | 345/158 |
| 7,924,264 B2 * | 4/2011 | Ohta | 345/157 |
| 8,010,313 B2 * | 8/2011 | Mathews et al. | 702/141 |
| 2008/0096654 A1 * | 4/2008 | Mondesir et al. | 463/31 |
| 2009/0262074 A1 * | 10/2009 | Nasiri et al. | 345/158 |
| 2011/0307173 A1 * | 12/2011 | Riley | 701/220 |

OTHER PUBLICATIONS

Azuma, Ronald et al. Improving Static and Dynamic Registration in an Optical See-Through HMD. Proceedings of SIGGRAPH '94 (Orlando, Fla., Jul. 24 29, 1994), Computer Graphics, Annual Conference Series, 1994, 197 204.*

* cited by examiner

*Primary Examiner* — William Boddie
*Assistant Examiner* — Bryan E Earles
(74) *Attorney, Agent, or Firm* — Ding Yu Tan

(57) ABSTRACT

A three-dimensional (3D) pointing device capable of accurately outputting a deviation including yaw, pitch and roll angles in a 3D reference frame and preferably in an absolute manner is provided. Said 3D pointing device comprises a six-axis motion sensor module including a rotation sensor and an accelerometer, and a processing and transmitting module. The six-axis motion sensor module generates a first signal set comprising angular velocities and a second signal set comprising axial accelerations associated with said movements and rotations of the 3D pointing device in the 3D reference frame. The processing and transmitting module utilizes a comparison method to compare the first signal set with the second signal set to obtain an updated state of the six-axis motion sensor module based on a current state and a measured state thereof in order to output the resulting deviation in the 3D reference frame and preferably in an absolute manner.

19 Claims, 7 Drawing Sheets

3D POINTING DEVICE AND METHOD FOR COMPENSATING MOVEMENT THEREOF

CROSS-REFERENCE TO RELATED APPLICATION

This application claims priority benefits of U.S. Patent Provisional Application No. 61/292,558, filed on Jan. 6, 2010. The entirety of the above-mentioned patent applications is hereby incorporated by reference herein and made a part of this specification.

BACKGROUND OF THE INVENTION

1. Field of the Invention

The present invention generally relates to a three-dimensional (3D) pointing device utilizing a motion sensor module and method of compensating and mapping signals of the motion sensor module subject to movements and rotations of said 3D pointing device. More particularly, the present invention relates to a 3D pointing device utilizing a six-axis motion sensor module with an enhanced comparison to calculate and compensate accumulated errors associated with the motion sensor module and to obtain actual resulting deviation angles in spatial reference frame and under dynamic environments.

2. Description of the Related Art

FIG. 1 is a schematic diagram showing a user using a handheld 3D pointing device 110 to point at a point on the screen 122 of a 2D display device 120. If the pointing device 110 emits a light beam, the point would be the location where the light beam hits the screen 122. For example, the pointing device 110 may be a mouse of a computer or a pad of a video game console. The display device 120 may be a part of the computer or the video game console. There are two reference frames, such as the spatial pointer reference frame and the display frame, associated with the pointing device 110 and the display device 120, respectively. The first reference frame or spatial pointer reference frame associated with the pointing device 110 is defined by the coordinate axes $X_P$, $Y_P$ and $Z_P$ as shown in FIG. 1. The second reference frame or display frame associated with the display device 120 is defined by the coordinate axes $X_D$, $Y_D$ and $Z_D$ as shown in FIG. 1. The screen 122 of the display device 120 is a subset of the $X_D Y_D$ plane of the reference frame $X_D Y_D Z_D$ associated with the display device 120. Therefore, the $X_D Y_D$ plane is also known as the display plane associated with the display device 120.

A user may perform control actions and movements utilizing the pointing device for certain purposes including entertainment such as playing a video game, on the display device 120 through the aforementioned pointer on the screen 122. For proper interaction with the use of the pointing device, when the user moves the pointing device 110, the pointer on the screen 122 is expected to move along with the orientation, direction and distance travelled by the pointing device 110 and the display 120 shall display such movement of the pointer to a new location on the screen 122 of the display 120. The orientation of the pointing device 110 may be represented by three deviation angles of the 3D pointing device 110 with respect to the reference frame $X_P Y_P Z_P$, namely, the yaw angle 111, the pitch angle 112 and the roll angle 113. The yaw, pitch and roll angles 111, 112, 113 may be best understood in relation to the universal standard definition of spatial angles related to commercial vehicles or transportation such as ships and airplanes. Conventionally, the yaw angle 111 may represent the rotation of the pointing device 110 about the $Z_P$ axis; the pitch angle 112 may represent the rotation of the pointing device 110 about the $Y_P$ axis; the roll angle 113 may represent the rotation of the pointing device 110 about the $X_P$ axis.

In a known related art as shown in FIG. 1, when the yaw angle 111 of the pointing device 110 changes, the aforementioned pointer on the screen 122 must move horizontally or in a horizontal direction with reference to the ground in response to the change of the yaw angle 111. FIG. 2 shows what happens when the user rotates the pointing device 110 counterclockwise by a degree such as a 90-degree about the $X_P$ axis.

In another known related art as shown in FIG. 2, when the yaw angle 111 changes, the aforementioned pointer on the screen 122 is expected to move vertically in response. The change of the yaw angle 111 can be detected by a gyro-sensor which detects the angular velocity $\omega_x$ of the pointing device 110 about the $X_P$ axis. FIG. 1 and FIG. 2 show that the same change of the yaw angle 111 may be mapped to different movements of the point on the screen 122. Therefore, a proper compensation mechanism for the orientation of the pointing device 110 is required such that corresponding mapping of the pointer on the screen 122 of the display 120 may be obtained correctly and desirably. The term compensation of the prior arts by Liberty (U.S. Pat. No. 7,158,118, U.S. Pat. No. 7,262,760 and U.S. Pat. No. 7,414,611) refers to the correction and compensation of signals subject to gravity effects or extra rotations about the axis related to "roll". The term of "comparison" of the present invention may generally refer to the calculating and obtaining of the actual deviation angles of the 3D pointing device 110 with respect to the first reference frame or spatial pointing frame $X_P Y_P Z_P$ utilizing signals generated by motion sensors while reducing or eliminating noises associated with said motion sensors; whereas the term mapping may refer to the calculating and translating of said deviation angles in the sptatial pointing frame $X_P Y_P Z_P$ onto the aforementioned pointer on the display plane associated with the 2D display device 120 of a second reference frame or display frame $X_D Y_D Z_D$.

It is known that a pointing device utilizing 5-axis motion sensors, namely, Ax, Ay, Az, $\omega_Y$ and $\omega_Z$ may be compensated. For example, U.S. Pat. No. 7,158,118 by Liberty, U.S. Pat. No. 7,262,760 by Liberty and U.S. Pat. No. 7,414,611 by Liberty provide such pointing device having a 5-axis motion sensor and discloses a compensation using two gyro-sensors $\omega_Y$ and $\omega_Z$ to detect rotation about the Yp and Zp axes, and accelerometers Ax, Ay and Az to detect the acceleration of the pointing device along the three axes of the reference frame $X_P Y_P Z_P$. The pointing device by Liberty utilizing a 5-axis motion sensor may not output deviation angles of the pointing device in, for example, a 3D reference frame; in other words, due to due to the limitation of the 5-axis motion sensor of accelerometers and gyro-sensors utilized therein, the pointing device by Liberty cannot output deviation angles readily in 3D reference frame but rather a 2D reference frame only and the output of such device having 5-axis motion sensors is a planar pattern in 2D reference frame only. In addition, it has been found that the pointing device and compensation disclosed therein cannot accurately or properly calculate or obtain movements, angles and directions of the pointing device while being subject to unexpected dynamic movement during the obtaining of the signals generated by the motion sensors, in particular, during unexpected drifting movements and/or accelerations along with the direction of gravity. In other words, it has been found that dynamic actions or extra accelerations including additional accelerations, in particular the one acted upon the direction substantially parallel to or along with the gravity imposed on the pointing device with the compensation methods provided by Liberty, said pointing device by Liberty cannot properly or accurately output the actual yaw, pitch and roll angles in the spatial reference frame $X_P Y_P Z_P$ and following which, consequently, the mapping of the spatial angles onto any 2D display reference frame such as $X_D Y_D Z_D$ may be greatly affected and erred. To be more specific, as the 5-axis compensation by Liberty cannot detect or compensate rotation about the $X_P$ axis directly or accurately, the rotation about the $X_P$ axis has to be derived from the gravitational acceleration detected by the accelerometer. Furthermore, the reading of the accelerometer may be accurate only when the pointing device is static since due to the limitation on known accelerometers that these sensors may not distinguish the gravitational acceleration from the acceleration of the forces including centrifugal forces or other types of additional accelerations imposed or exerted by the user.

Furthermore, it has been found that known prior arts may only be able to output a "relative" movement pattern in a 2D reference frame based on the result calculated from the signals of motion sensors. For example, the abovementioned prior arts by Liberty may only output a 2D movement pattern in a relative manner and a pointer on a display screen to show such corresponding 2D relative movement pattern. To be more specific, the pointer moves from a first location to a second new location relative to said first location only. Such relative movement from the previous location to the next location with respect to time cannot accurately determine and/or output the next location, particularly in situations where the previous location may have been an erred location or have been faultily determined as an incorrect reference point for the next location that is to be calculated therefrom and obtained based on their relative relationship adapted. One illustration of such defect of known prior arts adapting a relative relationship in obtaining a movement pattern may be clearly illustrated by an example showing the faultily outputted movements of a pointer intended to move out of a boundary or an edge of display screen. It has been found that as the pointer of known prior arts reaches the edge of a display and continues to move out of the boundary or edge at a certain extra extent beyond said boundary, the pointer fails to demonstrate a correct or "absolute" pattern as it moves to a new location either within the display or remaining outside of the boundary; in other words, instead of returning to a new location by taking into account said certain extra extend beyond the boundary made earlier in an "absolute" manner, the pointer of known arts discards such virtual distance of the extra extend beyond the boundary already made and an erred next position is faultily outputted due to the relative relationship adapted and utilized by the pointer. may be never calculated or processed due to the faultily obtained location at the edge or boundary of the display as well as the relative relationship adapted to obtain its next location therefrom.

Therefore, it is clear that an improved pointing device with enhanced calculating or comparison method capable of accurately obtaining and calculating actual deviation angles in the spatial pointer frame as well as mapping of such angles onto a pointer on the display frame in dynamic environments and conditions is needed. In addition, as the trend of 3D technology advances and is applicable to various fields including displays and interactive systems, there is a significant need for a 3D pointing device capable of accurately outputting a deviation of such device readily useful in a 3D or spatial reference frame. Furthermore, there is a need to provide an enhanced comparison method applicable to the processing of signals of motion sensors such that errors and/or noises associated with such signals or fusion of signals from the motions sensors may be corrected or eliminated. In addition, according to the field of application, such output of deviation in 3D reference frame may too be further mapped or translated to a pattern useful in a 2D reference frame.

SUMMARY OF THE INVENTION

According to one aspect of an example embodiment of the present invention, a 3D pointing device utilizing a six-axis motion sensor module is provided. The 3D pointing device comprises an accelerometer to measure or detect axial accelerations Ax, Az, Ay and a rotation sensor to measure or detect angular velocities $\omega_x$, $\omega_y$, $\omega_z$ such that resulting deviation including resultant angles comprising yaw, pitch and roll angles in a spatial pointer frame of the 3D pointing device subject to movements and rotations in dynamic environments may be obtained and such that said resulting deviation including said resultant angles may be obtained and outputted in an absolute manner reflecting or associating with the actual movements and rotations of the 3D pointer device of the present invention in said spatial pointer reference frame.

According to another aspect of the present invention, the present invention provides an enhanced comparison method to eliminate the accumulated errors as well as noises over time associated with signals generated by a combination of motion sensors, including the ones generated by accelerometers $A_x$, $A_y$, $A_z$ and the ones generated by gyroscopes $\omega_x$, $\omega_y$, $\omega_z$ in dynamic environments. In other words, accumulated errors associated with a fusion of signals from a motions sensor module comprising a plurality of motion sensors to detect movements on and rotations about different axes of a reference frame may be eliminated or corrected.

According to still another aspect of the present invention, the present invention provides an enhanced comparison method to correctly calculating and outputting a resulting deviation comprising a set of resultant angles including yaw, pitch and roll angles in a spatial pointer frame, preferably about each of three orthogonal coordinate axes of the spatial pointer reference frame, by comparing signals of rotation sensor related to angular velocities or rates with the ones of accelerometer related to axial accelerations such that these angles may be accurately outputted and obtained, which may too be further mapping to another reference frame different from said spatial pointer frame.

According to still another aspect of the present invention, the present invention provides a mapping of the abovementioned resultant angles, preferably about each of three orthogonal coordinate axes of the spatial pointer reference frame, including yaw, pitch and roll angles in a spatial pointer reference frame onto a display frame such that a movement pattern in a display frame different from the spatial pointer reference frame may be obtained according to the mapping or translation of the resultant angles of the resultant deviation onto said movement pattern.

According to another example embodiment of the present invention, a 3D pointing device utilizing a six-axis motion sensor module with an enhanced comparison method for eliminating accumulated errors of said six-axis motion sensor module to obtain deviation angles corresponding to movements and rotations of said 3D pointing device in a spatial pointer reference frame is provided. The 3D pointing device and the comparison method provided by the present invention by comparing signals from the abovementioned six-axis motion sensor module capable of detecting rotation rates or angular velocities of the 3D pointing device about all of the $X_P$, $Y_P$ and $Z_P$ axes as well as axial accelerations of the 3D pointing device along all of the $X_P$, $Y_P$ and $Z_P$ axes. In other words, the present invention is capable of accurately outputting the abovementioned deviation angles including yaw, pitch and roll angles in a 3D spatial pointer reference frame of the 3D pointing device to eliminate or reduce accumulated errors and noises generated over time in a dynamic environment including conditions such as being subject to a combination of continuous movements, rotations, external gravity forces and additional extra accelerations in multiple directions or movement and rotations that are continuously non-linear with respect to time; and furthermore, based on the deviation angles being compensated and accurately outputted in 3D spatial pointer reference frame may be further mapped onto or translated into another reference frame such as the abovementioned display frame, for example a reference in two-dimension (2D).

According to another example embodiment of the present invention, a 3D pointing device utilizing a six-axis motion sensor module is provided; wherein the six-axis motion sensor module of the 3D pointing device comprises at least one gyroscope and at least one accelerometer. In one preferred embodiment of the present invention, the six-axis motion sensor module comprises a rotation sensor capable of detecting and generating angular velocities of $\omega_x$, $\omega_y$, $\omega_z$ and an accelerometer capable of detecting and generating axial accelerations of Ax, Ay, Az. It can be understood that in another preferred embodiment, the abovementioned rotation sensor may comprise three gyroscopes corresponding to each of the said angular velocities of $\omega_x$, $\omega_y$, $\omega_z$ in a 3D spatial pointer reference frame of the 3D pointing device; whereas the abovementioned accelerometer may comprise three accelerometers corresponding to each of the said axial accelerations Ax, Ay, Az in a 3D spatial pointer reference frame of the 3D pointing device. The rotation sensor detects the rotation of the 3D pointing device with respect to a reference frame associated with the 3D pointing device and provides a rotation rate or angular velocity output. The angular velocity output includes three components corresponding to the rotation rate or angular velocities $\omega_x$, $\omega_y$, $\omega_z$ of the 3D pointing device about the first axis, the second axis and the third axis of the reference frame, namely, Xp, Yp and Zp of the 3D spatial pointer frame. The accelerometer detects the axial accelerations of the 3D pointing device with respect to the spatial pointer reference frame such as a 3D-pointer reference frame and provides an acceleration output. The acceleration output includes three components corresponding to the accelerations, Ax, Az, Ay of the 3D pointing device along the first axis, the second axis and the third axis of the reference frame, namely, Xp, Yp and Zp of the 3D spatial pointer frame. It can, however, be understood that the axes of Xp, Yp and Zp of the 3D spatial pointer frame may too be represented simply by the denotation of X, Y and Z.

According to another example embodiment of the present invention, a method for compensating accumulated errors of signals of the abovementioned six-axis motion sensor module in dynamic environments associated in a spatial pointer reference frame is provided. In one embodiment, the method may be performed or handled by a hardware processor. The processor is capable of compensating the accumulated errors associated with the resultant deviation in relation to the signals of the above-mentioned six-axis motion sensor module of the 3D pointing device subject to movements and rotations in a spatial pointer reference frame and in a dynamic environment by performing a data comparison to compare signals of rotation sensor related to angular velocities with the ones of accelerometer related to axial accelerations such that the resultant deviation corresponding to the movements and rotations of the 3D pointing device in the 3D spatial pointer frame may be obtained accurately over time in the dynamic environments.

According to another embodiment of the present invention, a method for obtaining a resulting deviation including resultant angles in a spatial pointer reference frame of a three-dimensional (3D) pointing device utilizing a six-axis motion sensor module therein and subject to movements and rotations in dynamic environments in said spatial pointer reference frame is provided. Said method comprises the steps of: obtaining a previous state associated with previous angular velocities $\omega_x$, $\omega_y$, $\omega_z$ gained from the motion sensor signals of the six-axis motion sensor module at a previous time T−1; obtaining a current state of the six-axis motion sensor module by obtaining measured angular velocities $\omega_x$, $\omega_y$, $\omega_z$ gained from the motion sensor signals at a current time T; obtaining a measured state of the six-axis motion sensor module by obtaining measured axial accelerations Ax, Ay, Az gained from the motion sensor signals at the current time T and calculating predicted axial accelerations Ax', Ay', Az' based on the measured angular velocities $\omega_x$, $\omega_y$, $\omega_z$ of the current state; obtaining an updated state of the six-axis motion sensor module by comparing the current state with the measured state of the six-axis motion sensor module; and calculating and converting the updated state of the six axis motion sensor module to said resulting deviation comprising said resultant angles in said spatial pointer reference frame of the 3D pointing device.

According to another aspect of the present invention, a method for mapping deviation angles associated with movements and rotations of a 3D pointing device in a spatial pointer reference frame onto a display frame of a display having a predetermined screen size is provided. In one embodiment, the method for mapping or translating deviation angles including yaw, pitch and roll angles in a spatial pointer reference frame to an pointing object, such as a pointer, having movements in a display frame, preferably a 2D reference frame, comprises the steps of obtaining boundary information of the display frame by calculating a predefined sensitivity associated with the display frame and performing angle and distance translation in the display frame based on said deviation angles and boundary information.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
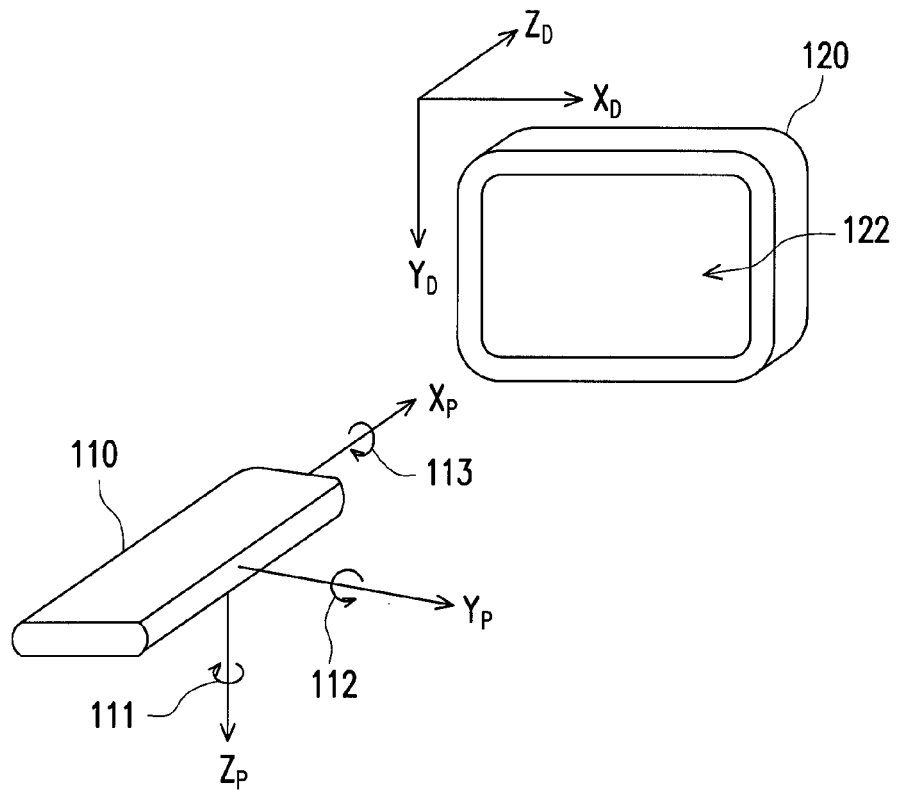
FIG. 1 shows a known related art having a 5-axis motion sensor in 2D reference frame.

Reference will now be made in detail to the present embodiments of the invention, examples of which are illustrated in the accompanying drawings. Wherever possible, the same reference numbers are used in the drawings and the description to refer to the same or like parts.

Figure 2:
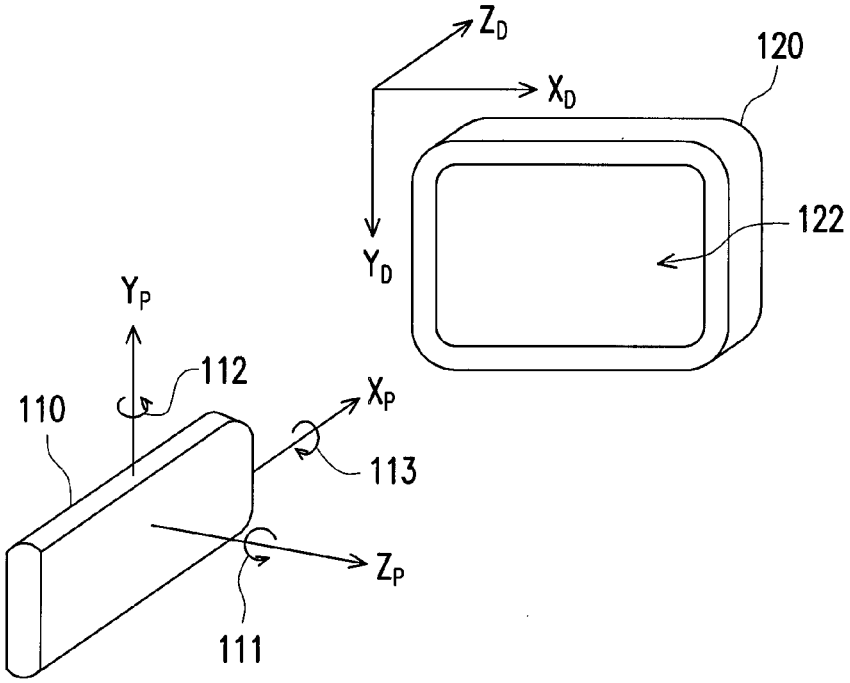
FIG. 2 shows the known related art having a 5-axis motion sensor as shown in FIG. 1 being rotated or rolled about Xp axis and is subject to further dynamic interactions or environment.
Figure 3:
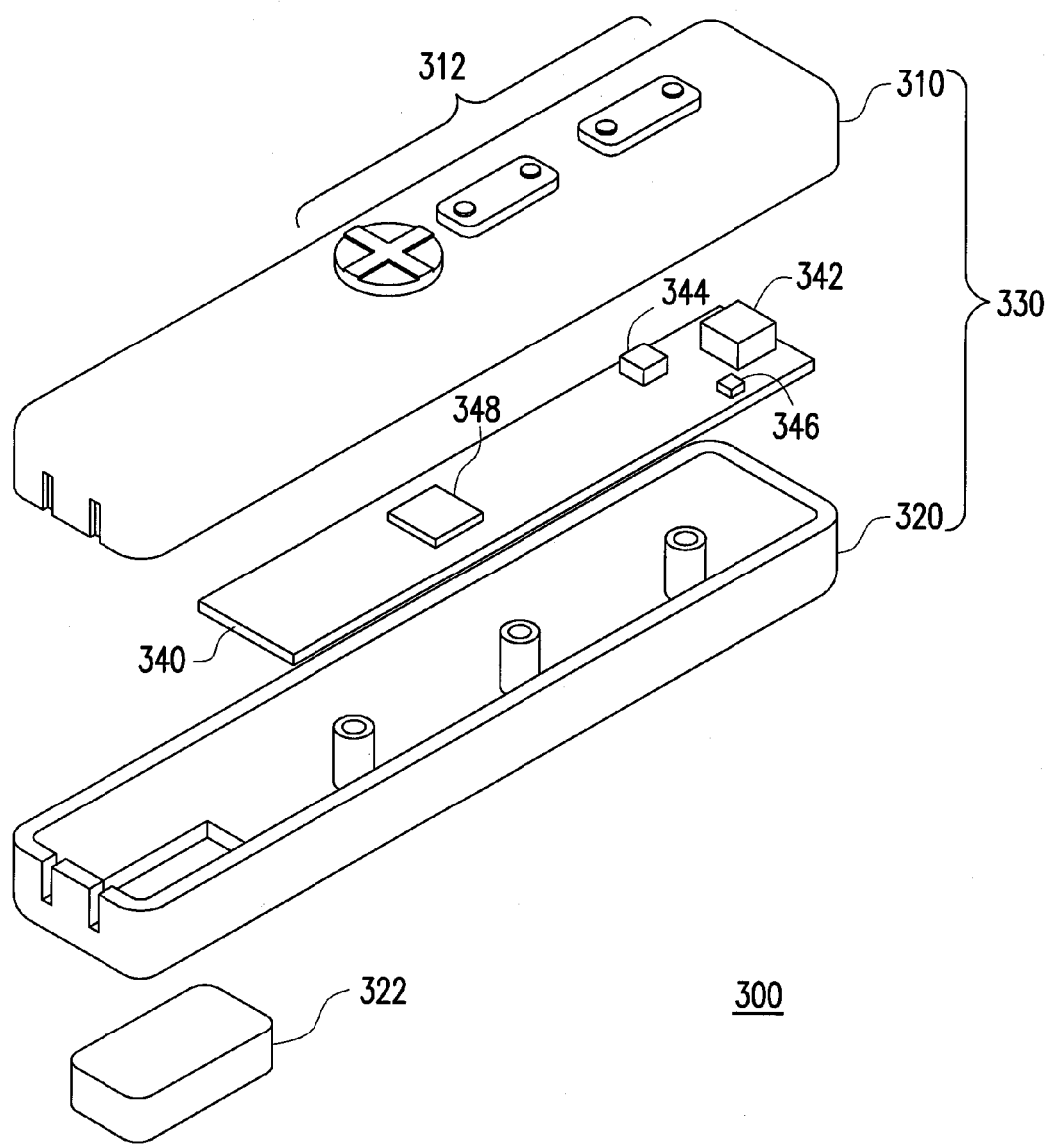
FIG. 3 is an exploded diagram showing a 3D pointing device utilizing a six-axis motion sensor module according to one embodiment of the present invention in a 3D spatial pointer reference frame.

FIG. 3 is an exploded diagram showing a 3D pointing device 300 according to an embodiment of the present invention. The 3D pointing device 300 is subject to movements and rotations in dynamic environments in a 3D spatial pointer reference frame. The spatial pointer reference frame is analogous to the reference frame $X_P Y_P Z_P$ in FIG. 1 and FIG. 2. The movements and rotations of the 3D pointing device 300 in the aforementioned dynamic environments in the spatial pointer reference frame may be continuously nonlinear with respect to time.

The 3D pointing device 300 includes a top cover 310, a printed circuit board (PCB) 340, a rotation sensor 342, an accelerometer 344, a data transmitting unit 346, a computing processor 348, a bottom cover 320, and a battery pack 322. The top cover 310 may include a few control buttons 312 for a user to issue predefined commands for remote control. In one embodiment, the housing 330 may comprise the top cover 310 and the bottom cover 320. The housing 330 may move and rotate in the spatial pointer reference frame according to user manipulation or any external forces in any direction and/or under the abovementioned dynamic environments. As shown in the FIG. 3, in one embodiment, the rotation sensor 342, the accelerometer 344, the data transmitting unit 346, and the computing processor 348 may be all attached to the PCB 340. The PCB 340 is enclosed by the housing 330. The PCB 340 includes at least one substrate having a longitudinal side configured to be substantially parallel to the longitudinal surface of the housing 330. An additional battery pack 322 provides electrical power for the entire 3D pointing device 300.

Figure 4:
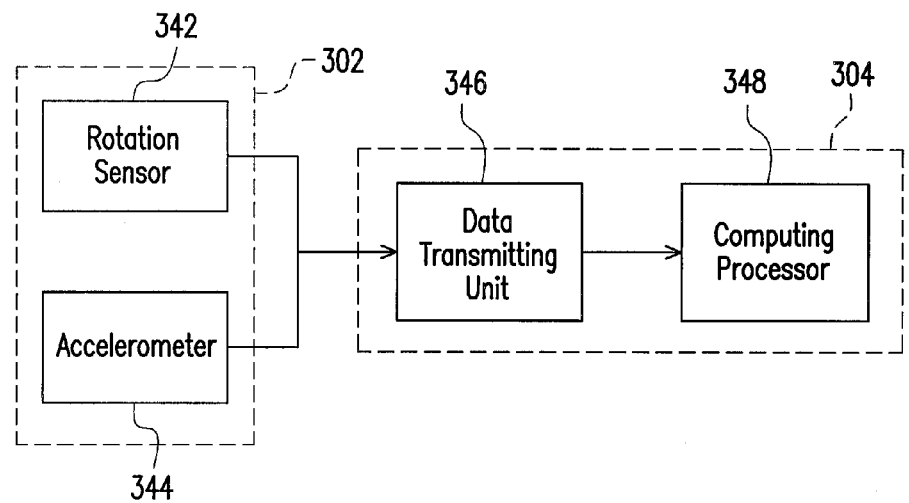
FIG. 4 is a schematic block diagram illustrating hardware components of a 3D pointing device according to one embodiment of the present invention.

FIG. 4 is a schematic block diagram illustrating hardware components of the 3D pointing device 300. The 3D pointing device 300 includes a six-axis motion sensor module 302 and a processing and transmitting module 304. The six-axis motion sensor module 302 includes the rotation sensor 342 and the accelerometer 344. The processing and transmitting module 304 includes the data transmitting unit 346 and the computing processor 348.

The rotation sensor 342 of the six-motion sensor module 302 detects and generates the first signal set including angular velocities $\omega_x, \omega_y, \omega_z$ associated with the movements and rotations of the 3D pointing device 300 about each of three orthogonal coordinate axes $X_P Y_P Z_P$ of the spatial pointer reference frame. The angular velocities $\omega_x, \omega_y,$ and $\omega_z$ are corresponding to the coordinate axes $X_P, Y_P$ and $Z_P$ respectively. The accelerometer 344 detects and generates the second signal set including axial accelerations Ax, Ay, Az associated with the movements and rotations of the 3D pointing device 300 along each of the three orthogonal coordinate axes $X_P Y_P Z_P$ of the spatial pointer reference frame. The axial accelerations Ax, Ay and Az are corresponding to the coordinate axes $X_P, Y_P$ and $Z_P$ respectively. The term "six-axis" means the three angular velocities $\omega_x, \omega_y, \omega_z$ and the three axial accelerations Ax, Ay, Az. It can therefore be understood that the abovementioned six axes of $X_p Y_p Z_p$ may not need to be orthogonal in a specific orientation and they may be rotated in different orientations; the present invention discloses such coordinate system for illustrative purposes only and any coordinates in different orientation and/or denotations may too be possible.

The data transmitting unit 346 is electrically connected to the six-axis motion sensor module 302 for transmitting the first and second signal sets. The data transmitting unit 346 transmits the first and second signal sets of the six-axis motion sensor module 302 to the computing processor 348 via electronic connections on the PCB 340. The computing processor 348 receives and calculates the first and second signal sets from the data transmitting unit 346. The computing processor 348 further communicates with the six-axis motion sensor module 302 to calculate the resulting deviation of the 3D pointing device 300 including three resultant angles preferably about each of the three axes of the spatial pointer reference frame. The resultant angles include the yaw angle 111, the pitch angle 112 and the roll angle 113 as shown in FIG. 1 and FIG. 2. In order to calculate the resulting deviation, the computing processor 348 utilizes a comparison to eliminate accumulated errors of the first and second signal sets of the six-axis motion sensor module 302, whereby the resultant angles in the spatial pointer reference frame, preferably about each of three orthogonal coordinate axes of the spatial pointer reference frame, of the resulting deviation of the six-axis motion sensor module 302 of the 3D pointing device 300 is obtained under the aforementioned dynamic environments and such that it is preferably obtained and outputted in an absolute manner reflecting or associating with the actual movements and rotations of the 3D pointer device of the present invention in said spatial pointer reference frame. In addition, said comparison utilized by the computing processor 348 may further comprise an update program to obtain an updated state of the six-axis motion sensor module based on a previous state associated with a first signal set in relation to the angular velocities cox, coy, oz and a measured state associated with said second signal set in relation to the axial accelerations Ax, Ay, Az. The abovementioned measured state may include a measurement of said second signal set or measured Ax, Ay, Az and a predicted measurement of Ax', Ay' and Az' obtained based on or calculated from the first signal set. Details of different states of the six-axis motion sensor module of the 3D pointing device of the present invention are provided in the later content.

In this embodiment, the computing processor 348 of the processing and transmitting module 304 further includes a mapping program for translating the resultant angles of the resulting deviation in the spatial pointer reference frame to a movement pattern in a display reference frame different from the spatial pointer reference frame. The display reference frame is analogous to the reference frame $X_D Y_D Z_D$ in FIG. 1 and FIG. 2. The movement pattern may be displayed on a screen of a 2D display device similar to the display device 120 in FIG. 1 and FIG. 2. The mapping program translates the resultant angles, preferably about each of three orthogonal coordinate axes of the spatial pointer reference frame to the movement pattern according to a sensitivity input correlated to the display reference frame.

Figure 5:
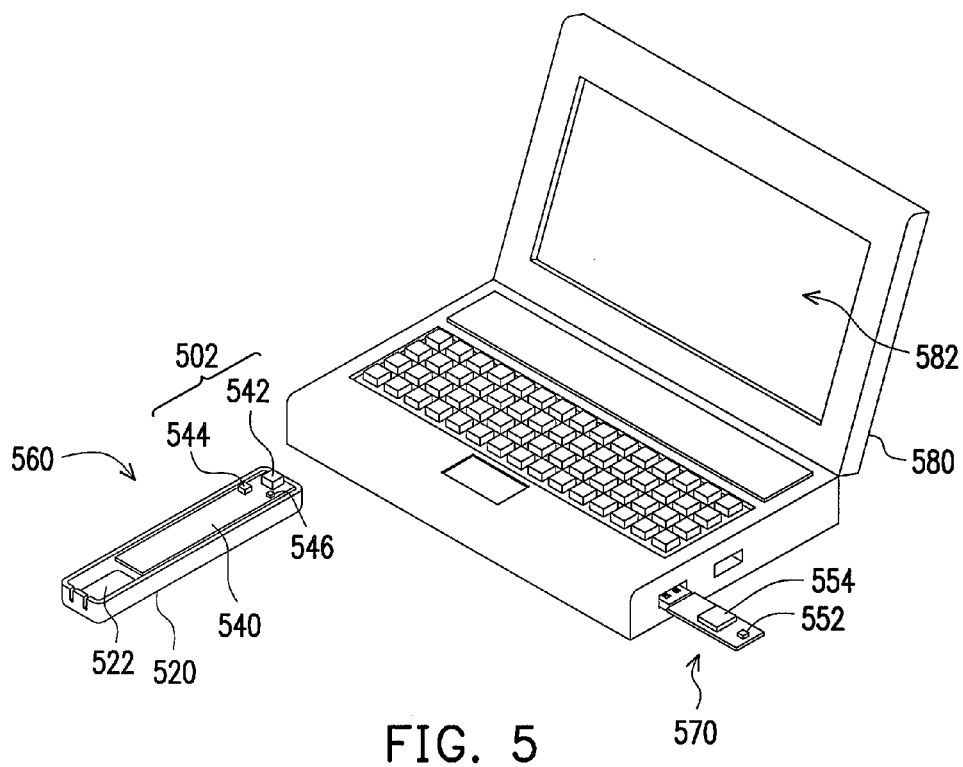
FIG. 5 is a schematic diagram showing a 3D pointing device utilizing a six-axis motion sensor module according to anther embodiment of the present invention in a 3D spatial pointer reference frame.

FIG. 5 is a schematic diagram showing a 3D pointing device 500 utilizing a six-axis motion sensor module according to anther embodiment of the present invention in a 3D spatial pointer reference frame. As shown in FIG. 5, the 3D pointing device 500 may comprise two parts 560 and 570 in data communication with each other. In one embodiment, the first part 560 includes a top cover (not shown), a PCB 540, a six-axis motion sensor module 502 comprising a rotation sensor 542 and an accelerometer 544, a data transmitting unit 546, a bottom cover 520, and a battery pack 522. The data transmitting unit 546 transmits the first signal set ($\omega_x$, $\omega_y$, $\omega_z$) generated by the rotation sensor 542 of the six-motion sensor module 502 and the second signal set (Ax, Ay, Az) generated by the accelerometer 544 of the six-motion sensor module 502 to the data receiving unit 552 of the second part 570 via wireless communication or connection including wireless local area network (WLAN) based on IEEE 802.11 standards or Bluetooth™. It can be understood that in another embodiment, wired communication or connection via a physical cable or electrical wires connecting the first part 560 and the second part 570 may too be possible.

In one embodiment, the second part 570 may be an external processing device to be adapted to another electronic computing apparatus or system such as a personal computer 580; for instance, the second part 570 may be coupled or adapted to an laptop computer via a standard interface, such as the universal serial bus (USB) interface depicted as shown in FIG. 5. The first part 560 and the second part 570 communicate via the data transmitting unit 546 and the data receiving unit 552. As previously mentioned, the data transmitting unit 546 and the data receiving unit 552 may communicate through wireless connection or wired connection. In other words, in terms of hardware configuration and data transmission, in one embodiment of the present invention, the six-axis motion sensor module 502 comprising the rotation sensor 542 and the accelerometer 544 may be disposed distally from the processing unit or computing processor 554; the signals from the six-axis motion sensor module 502 may then be transmitted via the data transmitting units 546, 552 to the computing processor 554 via wired or wireless communication including for example IEEE 802.11 standards or Bluetooth™.

The second part 570 of the 3D pointing device 500 according to one embodiment of the present invention comprises the data transmitting unit 552 and the processor 554. The data transmitting unit 552 of the second part 570 may be in data communication with the other data transmitting unit 546 disposed distally therefrom in the first part 560 as previously mentioned. The data transmitting unit 552 in the second part 570 receives the first and second signal sets from the data transmitting unit 546 in the first part 560 and transmits the first and second signal sets to the computing processor 554. In one embodiment, the computing processor 554 performs the aforementioned calculation as well as comparison of signals. In one embodiment, said comparison utilized by the computing processor 554 may further comprise an update program to obtain an updated state based on a previous state associated with said first signal set and a measured state associated with said second signal set. The measured state may further include a measurement of said second signal set and a predicted measurement obtained based on the first second signal set. The computing processor 554 is external to the housing of the 3D pointing device as depicted in FIG. 5. In one embodiment, the computing processor 554 also performs mapping by translating the resultant angles of the resulting deviation of the 3D pointing device in the spatial pointer reference frame, preferably about each of three orthogonal coordinate axes of the spatial pointer reference frame, to a movement pattern in a display reference frame associated with the notebook computer 580. The movement pattern may be displayed on the screen 582 of the notebook computer 580.

Figure 6:
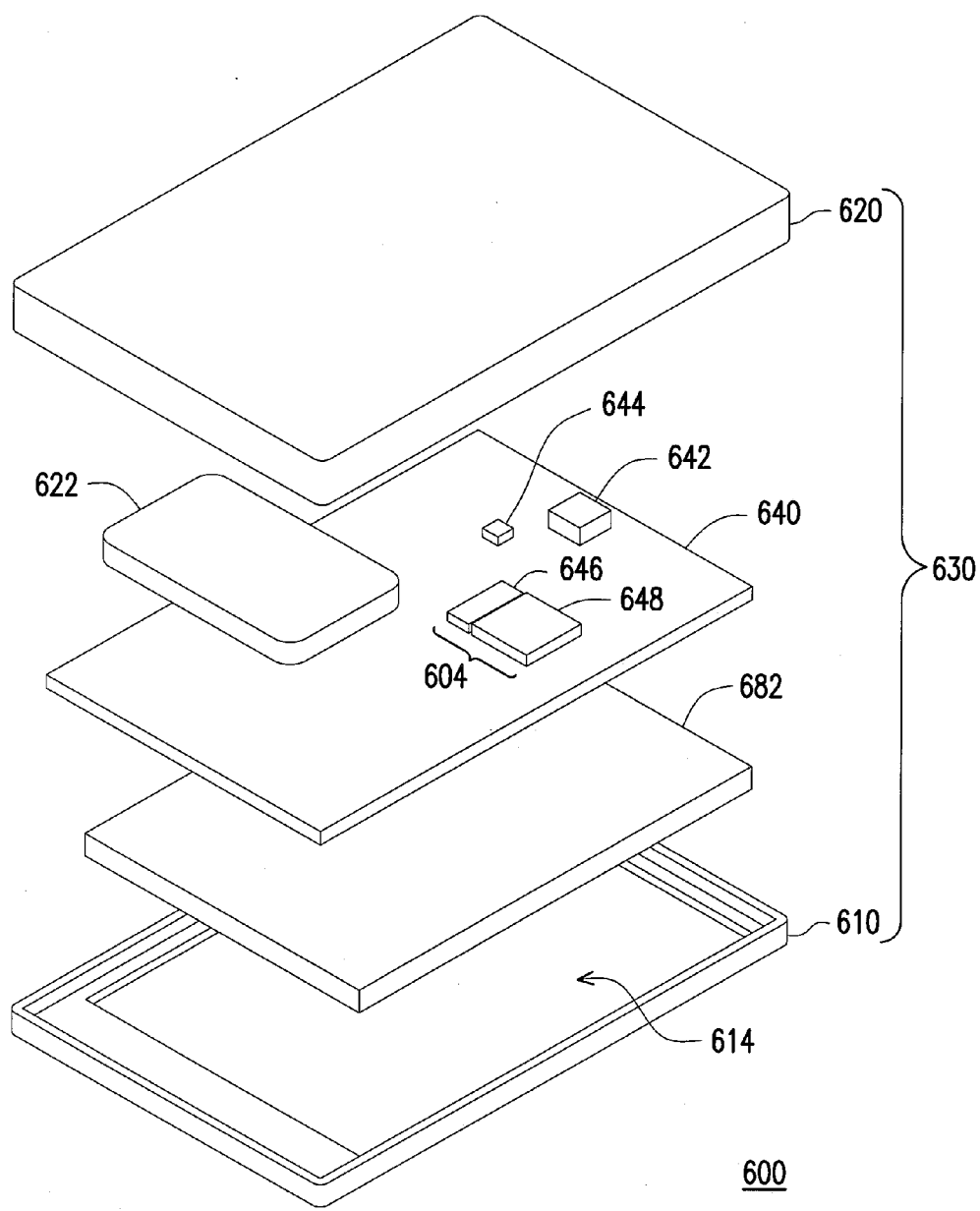
FIG. 6 is an exploded diagram showing a 3D pointing device utilizing a six-axis motion sensor module according to anther embodiment of the present invention in a 3D spatial pointer reference frame.

FIG. 6 is an exploded diagram showing a 3D pointing device 600 utilizing a six-axis motion sensor module according to anther embodiment of the present invention in a 3D spatial pointer reference frame. The 3D pointing device 600 may further comprises a built-in display 682. In other words, the abovementioned display reference frame associated with a display may need not to be external to the spatial pointer reference frame in terms of the hardware configuration of the present invention. In one embodiment, the 3D pointing device 600 comprises a bottom cover 620, a PCB 640, a battery pack 622, a rotation sensor 642, an accelerometer 644, a data transmitting unit 646, a computing processor 648, a display 682, and a top cover 610. Likewise, in one embodiment, the housing 630 may comprise the top and bottom covers 610, 620. A built-in display 682 may too be integrated on the housing 630; the six-axis motion sensor module 602 may comprise the rotation sensor 642 and the accelerometer 644. The data transmitting unit 646 and the computing processor 648 may also be integrated as a processing and transmitting module 604 of the 3D pointing device 600.

The computing processor 648 of the processing and transmitting module 604 may too perform the mapping of resultant deviation from or in said spatial reference frame or 3D reference frame to a display reference frame such as a 2D reference frame by translating the resultant angles of the resulting deviation of the 3D pointing device 600 in the spatial pointer reference frame, preferably about each of three orthogonal coordinate axes of the spatial pointer reference frame to a movement pattern in a display reference frame associated with the 3D pointing device 600 itself. The display 682 displays the aforementioned movement pattern. The top cover 610 includes a transparent area 614 for the user to see the display 682.

Figure 7:
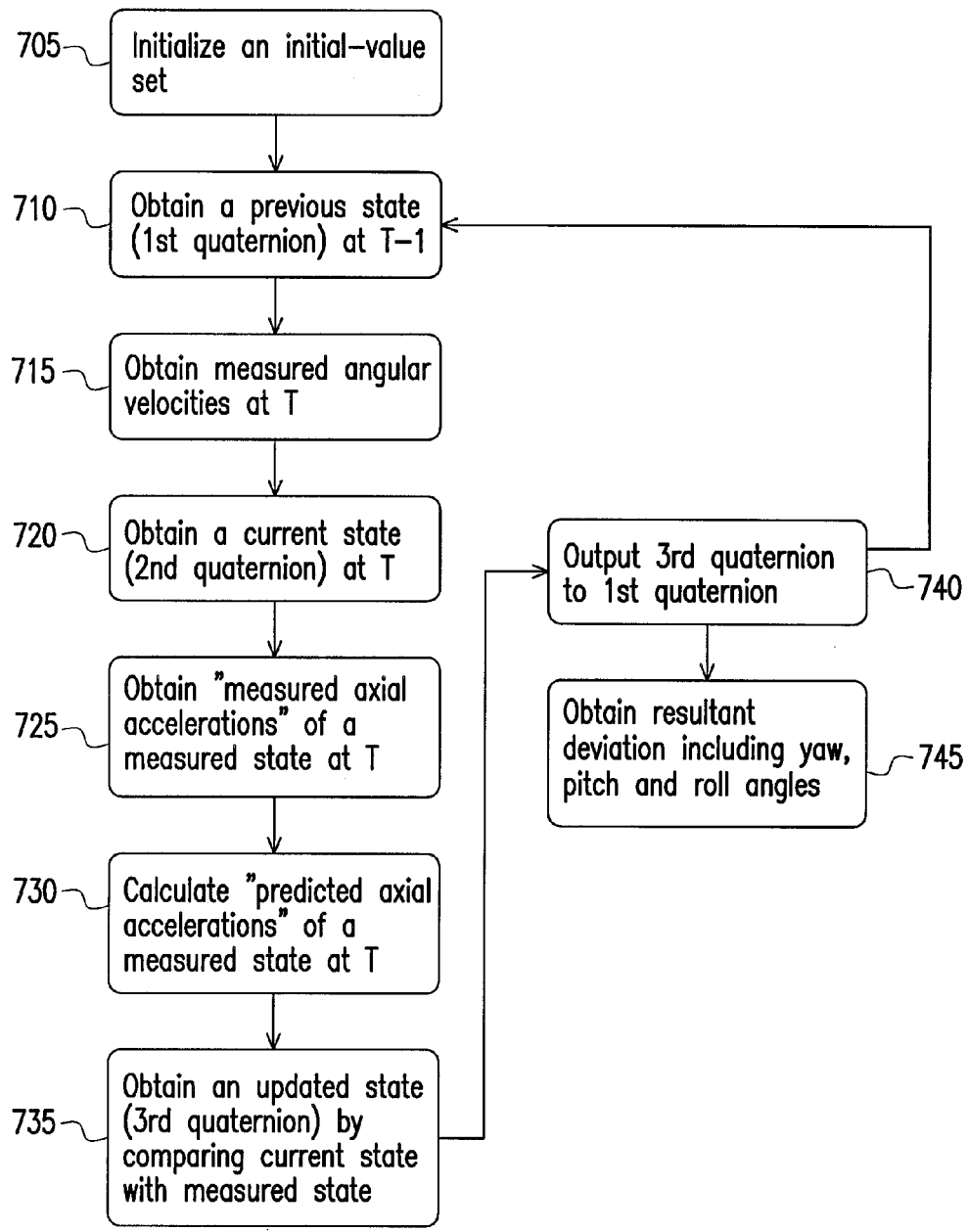
FIG. 7 is a flow chart illustrating a method for compensating deviation angles of a 3D pointing device having movements and rotations in a 3D spatial pointer reference frame and in a dynamic environment according to an embodiment of the present invention.

FIG. 7 is an explanatory flow chart illustrating a method for obtaining and/or outputting a resulting deviation including resultant angles in a spatial pointer reference frame of a 3D pointing device having movements and rotations in a 3D spatial pointer reference frame and in dynamic environments according to an embodiment of the present invention. The method in FIG. 7 may be a program or comparison model to be embedded or performed by the processing unit or computing processor 348, 554, 648 of the processing and transmitting module according to different embodiments of the present invention recited herein for illustrative purposes.

Accordingly, in one embodiment of the present invention, a method for obtaining a resulting deviation including resultant angles in a spatial pointer reference frame of a 3D pointing device utilizing a six-axis motion sensor module therein and subject to movements and rotations in dynamic environments in said spatial pointer reference frame is provided; and said method may comprise the following steps. First of all, as shown in FIG. 7, different states including "previous state", "current state", "measured state" and "update state" of the six-axis motion sensor module may be provided to represent a step or a set of steps utilized by the method for obtaining the resulting deviation in 3D reference frame, and preferably in the above-mentioned absolute manner. In one exemplary embodiment, the method comprises obtaining a previous state of the six-axis motion sensor module (such as steps 705, 710); and wherein the previous state includes an initial-value set or a first quaternion associated with previous angular velocities $\omega_x$, $\omega_y$, $\omega_z$ gained from the motion sensor signals of the six-axis motion sensor module at a previous time T−1; obtaining a current state of the six-axis motion sensor module by obtaining measured angular velocities $\omega_x$, $\omega_y$, $\omega_z$ gained from the motion sensor signals of the six-axis motion sensor module at a current time T (such as steps 715, 720); obtaining a measured state of the six-axis motion sensor module by obtaining measured axial accelerations Ax, Ay, Az gained from the motion sensor signals of the six-axis motion sensor module at the current time T (such as step 725) and calculating predicted axial accelerations Ax', Ay', Az' based on the measured angular velocities $\omega_x$, $\omega_y$, $\omega_z$ of the current state of the six-axis motion sensor module (such as step 730); obtaining an updated state of the six-axis motion sensor module by comparing the current state with the measured state of the six-axis motion sensor module (such as step 735); and calculating and converting the updated state of the six axis motion sensor module to said resulting deviation comprising said resultant angles in said spatial pointer reference frame of the 3D pointing device (745). In order to provide a continuous loop, the result of the updated state of the six-axis motion sensor module may preferably be outputted to the previous state; in one embodiment, the updated state may be a quaternion, namely third quaternion as shown in the figure, such that it may be directly outputted to the abovementioned previous state of another quaternion, namely the abovementioned first quaternion and as shown in the figure (such as step 740).

Figure 8:
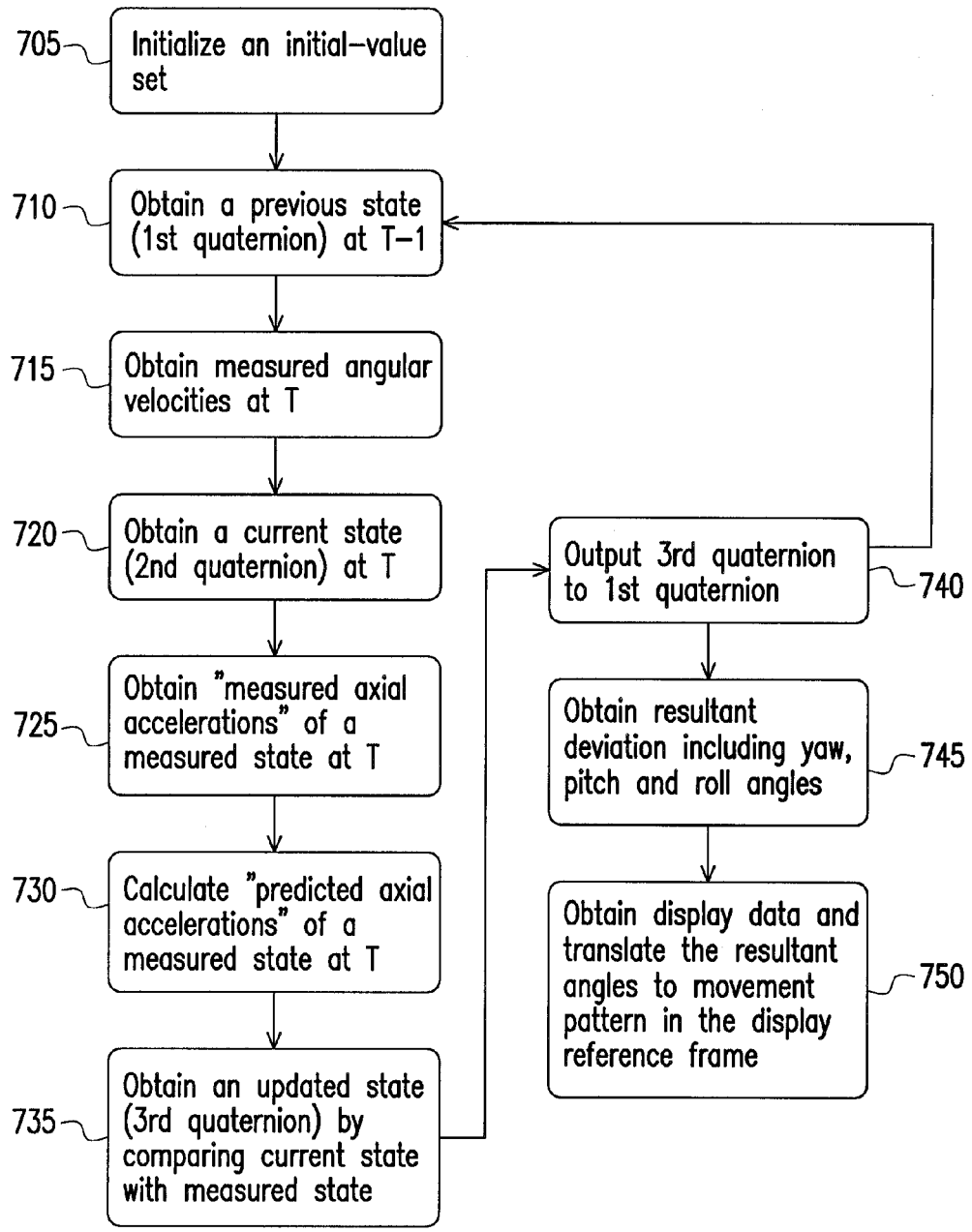
FIG. 8 shows a flow chart illustrating a method of mapping deviation angles of a 3D pointing device having movements and rotations in a 3D spatial pointer reference frame and in a dynamic environment onto a display reference frame according to another embodiment of the present invention.

In addition, it can be understood that the abovementioned comparison utilized by the processing and transmitting module and comprising the update program may too make reference to said different states of the six-axis motion sensor module as shown in FIGS. 7 and 8. As mentioned previously, the update program may be utilized by the processor to obtain the updated state of the six-axis motion sensor module based on the previous state associated with a first signal set in relation to the angular velocities $\omega_x$, $\omega_y$, $\omega_z$ and the measured state associated with said second signal set in relation to the axial accelerations Ax, Ay, Az. The abovementioned measured state may include a measurement of said second signal set or measured Ax, Ay, Az and a predicted measurement of Ax', Ay' and Az' obtained based on or calculated from the first signal set. Details of each of the abovementioned states of the six-axis motion sensor module and the related steps of the method for obtaining the resulting deviation of the 3D pointing device in 3D reference frame are as follows.

Referring to FIG. 7 again, the method for obtaining a resulting deviation including resultant angles in a spatial pointer reference frame of 3D pointing device utilizing a six-axis motion sensor module according to one embodiment of the present invention may begin at the obtaining of a previous state of the six-axis motion sensor module. In one embedment, the previous state of the six-axis motion sensor module may preferably be in a form of a first quaternion, and the first quaternion may be preferably initialized (step 705) at a very beginning of the process or method and as part of the obtaining of the previous state thereof. In other words, according to one embodiment of the present invention, the signals of the six-axis motion sensor are preferably to be initialized to zero and in particular, the signal or value associated with the yaw angle in terms of a quaternion value. The four elements of the first quaternion may be initialized with predetermined initial values. Alternatively, the first quaternion may be initialized or replaced by another signal sets generated by the rotation sensor and the accelerometer at a next time frame such that the method as shown in FIG. 7 is a continuous loop between a previous time frame T−1 and a present time frame T; details on the replacement of the first quaternion at T−1 with the later outputted quaternion at T is to be provided in the later content. It can be understood that one may make reference to Euler Angles for dentition on quaternion. Similarly, it can be easily comprehended that the abovementioned previous time T−1 and present time T may too be substitute by a present time T and a next time T+1 respectively and shall too fall within the scope and spirit of the present invention.

The first quaternion with respect to the previous time T is obtained as shown in the figure as step 710. The method illustrated in FIG. 7 may be performed in consecutive time frames. According to one embodiment of the present invention, steps 710-745 may be in a loop that may be performed one step at a time. In another embodiment, multiple steps may be performed simultaneously, such as the obtaining of signals from the six-axis motion sensor module may be performed simultaneously instead of one after another. It can therefore be understood that the steps recited herein are for illustrative purposes only and any other sequential orders or simultaneous steps are possible and shall be within the scope of the present invention. When step 710 is performed for the first time, the first quaternion initialized in step 705 is obtained. Otherwise, the first quaternion used in the present time T is generated in the previous time T−1. In other words, the step 710 may generally refer to or represented by the abovementioned "previous state" of the six-axis motion sensor module; according to another embodiment, the previous state may refer to the steps of 705 and 710.

The next may be to obtain the first signal set generated by the rotation sensor, which includes the measured angular velocities $\omega_x$, $\omega_y$ and $\omega_z$ as shown in step 715 according to an exemplary embodiment of the present invention. In step 720, the second quaternion with respect to a present time T is calculated and obtained based on the angular velocities $\omega_x$, $\omega_y$, and $\omega_z$. The step 715 and 720 may generally refer to or may be represented by the abovementioned "current state" of the six-axis motion sensor module. In one embodiment, the computing processor may use a data conversion utility to convert the angular velocities $\omega_x$, $\omega_y$, and $\omega_z$ into the second quaternion. This data conversion utility may be a program or instruction represented by the following equation (1).

$$\begin{bmatrix} \dot{q}_0 \\ \dot{q}_1 \\ \dot{q}_2 \\ \dot{q}_3 \end{bmatrix} = \frac{1}{2} \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \begin{bmatrix} q_0 \\ q_1 \\ q_2 \\ q_3 \end{bmatrix} \quad (1)$$

Equation (1) is a differential equation. The quaternion on the left side of the equal sign is the first order derivative with respect to time of the quaternion ($q_0$, $q_1$, $q_2$, $q_3$) on the right side of the equal sign. The data conversion utility uses the first quaternion as the initial values for the differential equation (1) and calculates the solution of the differential equation (1). The second quaternion may be represented by a solution of the differential equation (1).

As shown in the figure, the "measured state" of the six-axis motion sensor module according to one embodiment of the present invention may generally refer or may be represented by steps 725 and 730. In step 725, the second signal set generated by the accelerometer may be obtained, which includes measured axial accelerations Ax, Ay and Az; or Ax, Ay and Az may refer to the measurement of the axial accelerations obtained. In order to obtain said measured state of the six-axis motion sensor of the present invention, according to one embodiment, predicted axial accelerations Ax', Ay' and Az' may too be calculated and obtained based on the abovementioned current state of the six-axis motion sensor module or the second quaternion as shown in step 730. In other words, two sets of axial accelerations may be obtained for the measured state of the six-axis motion sensor module; one may be the measured axial accelerations Ax, Ay, As in step 725 and the other may be the predicted axial accelerations Ax', Ay', Az' in step 730 calculated based on the abovementioned current state or second quaternion in relation to the measured angular velocities thereof. Furthermore, in one embodiment, the computing processor may use a data conversion utility to convert the measured axial accelerations Ax, Ay and Az into a quaternion. This data conversion utility may be a software program represented by the following equations (2), (3) and (4).

$$Ax = 2(q_1 q_3 - q_0 q_2) \quad (2)$$

$$Ay = 2(q_2 q_3 + q_0 q_1) \quad (3)$$

$$Az = q_0^2 - q_1^2 - q_2^2 + q_3^2 \quad (4)$$

The computing processor calculates the solution ($q_0$, $q_1$, $q_2$, $q_3$) of the equations (2), (3) and (4).

According to an exemplary embodiment of the method for obtaining a resulting deviation including resultant angles in a spatial pointer reference frame of a 3D pointing device utilizing a six-axis motion sensor module, it may be preferable to compare the current state of the six-axis motion sensor module with the measured state thereof with respect to the present time frame T by utilizing a comparison model. In other words, in one embodiment as shown in step 735, it is preferable to compare the second quaternion in relation to the measured angular velocities of the current state at present time T with the measured axial accelerations Ax, Ay, Az as well as the predicted axial accelerations Ax', Ay', Az' also at present time T. Following which, a result may be obtained as an updated state of the six-axis motion sensor module. In an explanatory example, the updated state may generally refer to the update of the current state of the six-axis motion sensor module at preset time T. Instructions including equations related to the abovementioned current state, measured state and updated state may be illustrated in the following.

According to an exemplary embodiment of the comparison model utilized by the present invention in relation to step 735 as shown in the figure, the current state correlated to the abovementioned second quaternion and in relation to the angular velocities of gyroscope(s) may be obtained based on an exemplary equation of:

$$x(t|t-1) = f(x_{t-1}, u_t) \quad (5)$$

Preferably, a first probability (state transition probability) associated with the said current state may be further obtained based on an exemplary equation of:

$$P(x_t | x_{t-1}, u_t) = F_x P(x_{t-1} | x_{t-1}) F_x^T + F_u P(u_{t-1} | u_{t-1}) F_u^T + Q_t$$  (6)

$$F_x = \frac{\partial f(x_{t-1}, u_t)}{\partial x_{t-1}} \quad (6)$$

$$F_u = \frac{\partial f(x_{t-1}, u_t)}{\partial u_t} \quad (7)$$

wherein $Q_t$=additional motion noise
Likewise, the measured state correlated to the abovementioned second axial accelerations and in relation to the axial accelerations of accelerometers and current state may be obtained based on an exemplary equation of:

$$z_t(t|t-1) = h(x(t|t-1)) \quad (8)$$

Preferably, a second probability (measurement probability) associated with the measured state may be further obtained based on an exemplary equation of:

$$P(z_t | x_t) = H_x P(x_t | x_{t-1}) H_x^T + R_t \quad (9)$$

$$H_x = \frac{\partial h(x(t|t-1))}{\partial x(t|t-1)} \quad (10)$$

wherein $R_t$=measurement noise

As an illustrative example, the abovementioned first and second probabilities may be further utilized to obtain the updated state of the six-axis motion sensor module based on an exemplary method of data association of an exemplary equation of:

$$D_t = \{[z_t - h(z(t|t-1))] P(z_t|x_t) [z_t - h(x(t|t-1))]^{-1}\}^{1/2} \quad (11)$$

In one embodiment, the result of the updated state of the six-axis motion sensor module, preferably involving comparison or data association represented by the equations, may be a third quaternion as shown in the figure. Furthermore, the result may then be further outputted and utilized to obtain a resulting deviation including resultant angles in a spatial pointer reference frame in the following steps as shown in the figure. It can be understood that the examples of current state, measured state, state update, data association and probabilities of the comparison model and method of the present invention are provided for illustrative purposes only.

As mentioned previously, it may be preferable to output the result of the updated state, preferably in a form of third quaternion, to the previous state of the six-axis motion sensor module as shown in step 740 in the figure. In other words, in one embodiment, the first quaternion may be replaced by the abovementioned third quaternion or substitute directly any previous values of first quaternion in the previous time T for further process in a loop. In other words, the third quaternion with respect to the present time T becomes the first quaternion with respect to the next time such as T+1; or, the third quaternion at previous time frame T−1 outputted may now be the first quaternion at present time frame T.

In step 745, the updated state of the six-axis motion sensor module of the present invention may be further calculated and convert to the resulting deviation including resultant angles associated with the spatial pointer reference frame, wherein the resultant angles includes the yaw angle, pitch angle and roll angle of the 3D pointing device associated with the spatial pointer reference frame, preferably about each of three orthogonal coordinate axes of the spatial pointer reference frame. In one embodiment, the computing processor may use a data conversion utility to convert the third quaternion of the updated state of the six-axis motion sensor module into the yaw, pitch and roll angles thereof. This data conversion utility may be a program or instruction represented by the following equations (12), (13) and (14).

$$\text{yaw} = \arctan\left(\frac{2(q_0 q_3 + q_1 q_2)}{q_0^2 + q_1^2 - q_2^2 - q_3^2}\right) \quad (12)$$

$$\text{pitch} = \arcsin(2(q_0 q_2 - q_3 q_1)) \quad (13)$$

$$\text{roll} = \arctan\left(\frac{2(q_0q_1 + q_2q_3)}{q_0^2 - q_1^2 - q_2^2 + q_3^2}\right) \quad (14)$$

The variables $q_0$, $q_1$, $q_2$ and $q_3$ in equations (12), (13) and (14) are the four elements of the third quaternion.

For a looped method continuous with respect to time, in one embodiment of the present invention, the method utilized by for example the computing processor communicated with the six-axis motion sensor module may return to step 710 to perform the comparison process or method with respect to the next time T+1. In addition, the abovementioned resulting deviation including resultant angles comprising yaw, pitch and roll angles in the spatial reference frame converted from the third quaternion is preferably obtained and outputted in an absolute manner reflecting or associating with the actual movements and rotations of the 3D pointer device of the present invention in said spatial pointer reference frame. It can be understood that said actual movements and rotations of the 3D pointer device of the present invention in the spatial pointer reference frame or 3D reference frame may refer to real-time movements and rotations associated with vectors having both magnitudes and directions along or about orthogonal axes in the spatial pointer reference frame under the dynamic environments.

Figure 9:
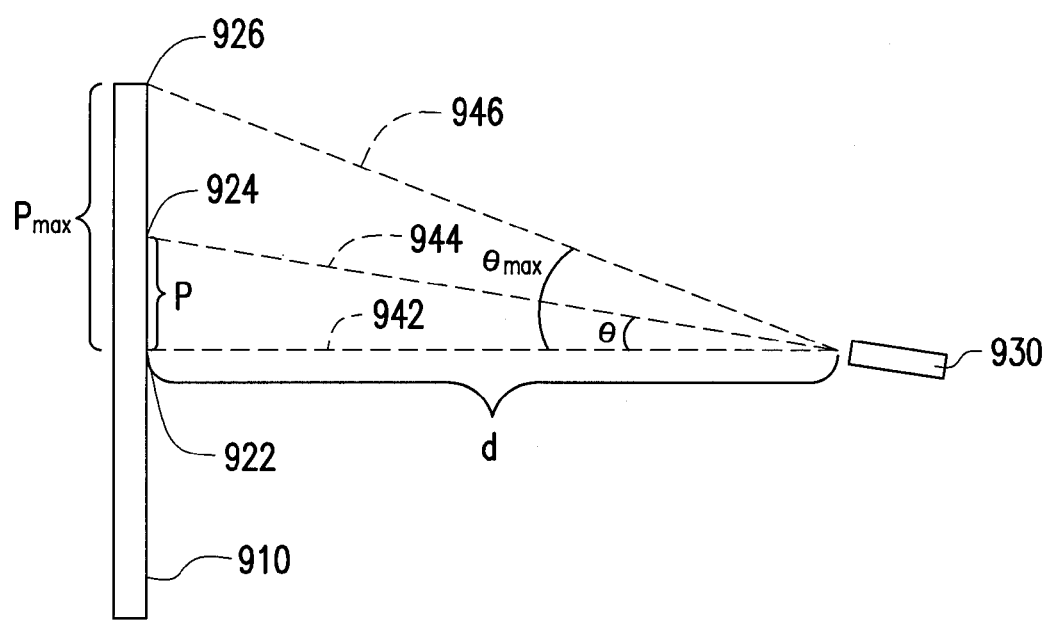
FIG. 9 is a schematic diagram showing the mapping of the resultant angles of the resultant deviation of a 3D pointing device according to an embodiment of the present invention.

FIG. 8 shows a flow chart illustrating a method of mapping resultant deviation angles of a 3D pointing device having movements and rotations in a 3D spatial pointer reference frame and in a dynamic environment onto a display reference frame according to another embodiment of the present invention. FIG. 9 is a schematic diagram showing the aforementioned mapping of the resultant angles of the resultant deviation of a 3D pointing device according to this embodiment. For illustrative purposes, the difference between FIG. 7 and FIG. 8 may be represented by the additional mapping step 750 as shown in FIG. 8. Steps 705-745 in FIG. 8 are the same as their counterparts in FIG. 7, which perform the comparison process for the 3D pointing device. Step 750 performs the mapping process for the 3D pointing device. The computing processor may include a mapping program that performs the mapping step 750. At step 750, the processing and transmitting module may obtain display data including for example, display screen size such as boundary information, and translates the resultant angles of the resulting deviation associated with the spatial pointer reference frame, preferably about each of three orthogonal coordinate axes of the spatial pointer reference frame, to a movement pattern in a mapping area in a display reference frame based on a sensitivity input correlated to the display reference frame. It can be understood that the above-mentioned display data may too include or refer to the type of display such as LED, LCD, touch panel or 3D display as well as frequency rate of display such as 120 Hz or 240 Hz. In one embodiment, the display reference frame associated with the display to be mapped may be a 2D display reference frame; in another embodiment, the display reference frame may be a 3D display reference frame of a 3D display.

The aforementioned display data may further include a sensitivity input. The aforementioned sensitivity input is a parameter which may be inputted and adjusted by a user through control buttons attached on the housing of the 3D pointing device. The sensitivity input may represent the sensitivity of the display device with respect to the movement of the 3D pointing device. For details of the mapping process, please refer to FIG. 9. In one embodiment, the sensitivity input is a parameter representing the relationship between the display to be mapped with deviation to a movement pattern in 2D display reference frame and the 3D pointing device of the present invention outputted with said deviation including yaw, pitch and roll angles in 3D pointer reference frame; wherein the relationship may be a distance relationship. In another embodiment, the sensitivity input may be a display screen size including boundary information predetermined by a user; wherein the boundary information may be obtained based on a user input or manual input data from the user. In still another embodiment, the sensitivity input may be predefined or preset in the mapping program such that the parameter of the sensitivity input is a preset value for either increase or decrease the movement patterns including distance or number of pixels to be moved or mapped from said deviation of the 3D pointing device.

FIG. 9 is a bird's-eye view of a 3D pointing device 930 and the display screen 910 of a display device according to an embodiment of the present invention. The display screen has a central point 922, a target point 924 and a boundary point 926. The central point 922 is the geometric center of the display screen 910. The target point 924 is the position that the 3D pointing device 930 is pointing at. The boundary point 926 is a point on the right boundary of the display screen 910. The points 922, 924, 926 and the 3D pointing device 930 are on a common plane parallel to both the $X_D$ axis and the $Z_D$ axis of the display reference frame $X_D Y_D Z_D$. Virtual beams 942, 944 and 946 are imaginary light beams from the 3D pointing device 930 to the central point 922, the target point 924 and the boundary point 926, respectively. The distance P is the distance between the central point 922 and the target point 924, while the distance $P_{max}$ is the distance between the central point 922 and the boundary point 926. The distance d is the distance between the central point 922 and the 3D pointing device 930. The aforementioned yaw angle of the resultant deviation of the 3D pointing device 930 is the angle θ between the virtual beams 942 and 944, while the angle $\theta_{max}$ is the angle between the virtual beams 942 and 946. The aforementioned mapping area is a plane including the display surface of the display screen 910 in the display reference frame. The display surface of the display screen 910 is a subset of the mapping area.

In this embodiment, the aforementioned sensitivity input is provided by the user of the 3D pointing device 930. The sensitivity β is defined by the following equation (15).

$$\beta = \frac{P_{max}}{\theta_{max}} \quad (15)$$

The variable β in equation (16) is the sensitivity input defined by user.

The following equation (16) may be derived from equation (15) and geometry.

$$d = \frac{P_{max}}{\tan\left(\frac{P_{max}}{\beta}\right)} \quad (16)$$

The following equation (17) may be derived from equations (16).

$$P = f(\theta) = d \times \tan\theta = \frac{P_{max} \times \tan\theta}{\tan\left(\frac{P_{max}}{\beta}\right)} \quad (17)$$

In equation (17), the distance $P_{max}$ may be obtained from the width of the display screen of the display data obtained at step 750; the angle $\theta$ is the yaw angle obtained at step 745; the sensitivity input $\beta$ is provided by the user. Therefore, the computing processor of the 3D pointing device 930 can calculate the distance P according to equation (17). Next, the computing processor can easily obtain the horizontal coordinate of the target point 924 on the display screen 910 according to the distance P and the width of the display screen 910. In addition, the computing processor can easily obtains the vertical coordinate of the target point 924 on the display screen 910 according to the pitch angle in a similar way.

The mapping process performed at step 750 may be exemplified by the process of translating the yaw angle and the pitch angle of the resultant angles to the 2D coordinates of the target point 924 on the display screen 910 discussed above. Now the computing processor has the coordinates of the target point 924 of the present time frame. The computing processor subtracts the coordinates of the target point 924 of the previous time frame from the coordinates of the target point 924 of the present time frame. The result of the subtraction is the horizontal offset and the vertical offset of the target point 924 in the present time frame. The horizontal and vertical offsets may be transmitted to the display device so that the display device can track the position of the target point 924. The display device may display a cursor or some video effect on the display screen 910 to highlight the position of the target point 924. The cursor or video effect may exhibit a movement pattern on the display screen 910 when the user moves the 3D pointing device 930.

Likewise, for a looped method continuous with respect to time, in one embodiment of the present invention, the method utilized by for example the computing processor communicated with the six-axis motion sensor module may return to step 710 to perform the comparison process or method with respect to the next time T+1.to perform the comparison and mapping process with respect to the next time frame.

In summary, the present invention also provides a six-axis comparison method that compares the detected signals generated by and converted from the rotation of the pointing device about all of the three axes with the detected signals generated by and converted from the acceleration of the pointing device along all of the three axes. In one embodiment, The six-axis comparison method may then output the resultant deviation including yaw, pitch and roll angles in a spatial pointer reference frame such as a 3D reference frame of the 3D pointing device. In another embodiment, the six-axis comparison method may also include the mapping of the resultant deviation including yaw, pitch and roll angles in the spatial pointer reference to a display reference frame such as a 2D display reference frame of a display screen of a display device. The six-axis comparison method involving the comparison of motion sensor signals, the calculation and conversion of quaternion of the present invention in order to output a resultant deviation having yaw, pitch and roll angles in for example 3D reference frame is novel and cannot be easily achieved by any know arts or their combinations thereof.

In view of the above, it is clear that such obtaining and outputting of deviation including 3D angles in a spatial pointer reference frame in an "absolute" manner of the present invention is novel, and the fact that the enhanced 3D pointing device having a novel comparison method and program of the present invention to obtain and output such deviation in "absolute" manner cannot be easily achieved by any known arts or their combination thereof. The term "absolute" associated with the resulting deviation including resultant angles such as yaw, pitch and roll in a spatial pointer reference frame or 3D reference frame obtained and outputted by the enhanced 3D pointing device of the present invention may refer to the "actual" movements and rotations of the 3D pointer device of the present invention in said spatial pointer reference frame. It is clear that known arts capable of only outputting planar angles or relative movements, in for example 2D reference frame, are devoid of providing a resulting deviation in such absolute manner provided by the present invention. Moreover, the six-axis comparison method of the present invention may accurately output said deviation including angles in 3D reference frame as noises associated with the six-motion sensor module subject to movement and rotations in dynamic environments and accumulated over time may be effectively eliminated or compensated. The current state, measured state, updated state of the six-axis motion sensor module utilized in the method for obtaining the resulting deviation and to eliminate the accumulated errors of the motion sensor module of the 3D pointing device of the present invention are novel and cannot be easily achieved by the known arts. Additionally, the resulting deviation including resultant angles in the spatial pointer reference frame or 3D reference frame of the present invention can be further mapped to another display reference frame or 2D reference frame and such mapping of "absolute" movements and rotations of the enhanced 3D pointing device of the present invention onto the display reference frame is novel and cannot be easily achieved by known arts or their combination thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents. Furthermore, the term "a", "an" or "one" recited herein as well as in the claims hereafter may refer to and include the meaning of "at least one" or "more than one". For example, it can be understood that a printed circuit board (PCB) recited herein may refer to more than one PCBs such that motion sensors such as rotation sensors or gyroscopes and/or accelerometers of the six-motion sensor module may be attached to more than one PCBs.

What is claimed is:

1. A three-dimensional (3D) pointing device subject to movements and rotations in dynamic environments, comprising:
a housing associated with said movements and rotations of the 3D pointing device in a spatial pointer reference frame;
a printed circuit board (PCB) enclosed by the housing;
a six-axis motion sensor module attached to the PCB, comprising a rotation sensor for detecting and generating a first signal set comprising angular velocities $\omega_x$, $\omega_y$, $\omega_z$ associated with said movements and rotations of the 3D pointing device in the spatial pointer reference frame, an accelerometer for detecting and generating a second signal set comprising axial accelerations Ax, Ay, Az associated with said movements and rotations of the 3D pointing device in the spatial pointer reference frame; and a processing and transmitting module, comprising a data transmitting unit electrically connected to the six-axis motion sensor module for transmitting said first and second signal sets thereof and a computing processor for receiving and calculating said first and second signal sets from the data transmitting unit, communicating with the six-axis motion sensor module to calculate a resulting deviation comprising resultant angles in said spatial pointer reference frame by utilizing a comparison to compare the first signal set with the second signal set whereby said resultant angles in the spatial pointer reference frame of the resulting deviation of the six-axis motion sensor module of the 3D pointing device are obtained under said dynamic environments, wherein the comparison utilized by the processing and transmitting module further comprises an update program to obtain an updated state based on a previous state associated with said first signal set and a measured state associated with said second signal set; wherein the measured state includes a measurement of said second signal set and a predicted measurement obtained based on the first signal set without using any derivatives of the first signal set.

2. The 3D pointing device of claim 1, wherein the dynamic environments include a condition in which said movements and rotations of the 3D pointing device in the spatial pointer reference frame are continuously nonlinear with respect to time.

3. The 3D pointing device of claim 1, wherein the PCB enclosed by the housing comprises at least one substrate having a first longitudinal side configured to be substantially parallel to a longitudinal surface of the housing.

4. The 3D pointing device of claim 1, wherein the spatial pointer reference frame is a reference frame in three dimensions; and wherein said resultant angles of the resulting deviation includes yaw, pitch and roll angles about each of three orthogonal coordinate axes of the spatial pointer reference frame.

5. The 3D pointing device of claim 1, wherein the data transmitting unit of the processing and transmitting module is attached to the PCB enclosed by the housing and transmits said first and second signal of the six-axis motion sensor module to the computing processor via electronic connections on the PCB.

6. The 3D pointing device of claim 1, wherein the computing processor of the processing and transmitting module is external to the housing and receives said first and second signal sets of the six-axis motion sensor module wirelessly from said data transmitting unit.

7. The 3D pointing device of claim 1, wherein the comparison utilized by the processing and transmitting module further comprises a data conversion utility for converting quaternion values associated with said first and second signal sets of the six-axis motion module as well as an integrated result to the resultant angles of the resulting deviation of the six-axis motion sensor module of the 3D pointing device in the spatial pointer reference frame.

8. The 3D pointing device of claim 1, wherein the computing processor of the processing and transmitting module further comprises a mapping program for translating said resultant angles of the resulting deviation of the six-axis motion sensor module of the 3D pointing device in the spatial pointer reference frame to a movement pattern in a display reference frame different from said spatial pointer reference frame and based on a sensitivity input correlated to said display reference frame.

9. The 3D pointing device of claim 8, wherein the sensitivity input correlated to the display reference frame is determined based on a user input and is associated with boundary information of a display apparatus having a corresponding mapping area in said display reference frame.

10. A three-dimensional (3D) pointing device subject to movements and rotations in dynamic environments in a 3D-pointer reference frame and associated with a movement pattern in a two-dimensional (2D)-display reference frame, comprising:

a housing associated with said movements and rotations of the 3D pointing device in the 3D-pointer reference frame;

a printed circuit board (PCB) enclosed by the housing;

a six-axis motion sensor module attached to the PCB, comprising a rotation sensor for detecting and generating a first signal set comprising angular velocities $\omega_x$, $\omega_y$, $\omega_z$ associated with said movements and rotations of the 3D pointing device in the 3D-pointer reference frame, an accelerometer for detecting and generating a second signal set comprising axial accelerations Ax, Ay, Az associated with said movements and rotations of the 3D pointing device in the 3D-pointer reference frame; and a processing and transmitting module, comprising a data transmitting unit electrically connected to the six-axis motion sensor module for transmitting said first and second signal sets thereof and a computing processor for receiving and calculating said first and second signal sets from the data transmitting unit, communicating with the six-axis motion sensor module to calculate a resulting deviation comprising resultant angles in said 3D-pointer reference frame by utilizing a comparison to compare the first signal set with the second signal set; and wherein the computing processor further comprises a mapping program for translating said resultant angles of the resulting deviation of the six-axis motion sensor module of the 3D pointing device in the 3D-pointer reference frame to said movement pattern in the 2D-display reference frame based on a sensitivity input correlated to said 2D-display reference frame, wherein the comparison utilized by the processing and transmitting module further comprises an update program to obtain an updated state based on a previous state associated with said first signal set and a measured state associated with said second signal set; wherein the measured state includes a measurement of said second signal set and a predicted measurement obtained based on the first signal set without using any derivatives of the first signal set; and wherein said resultant angles of the resulting deviation includes yaw, pitch and roll angles about each of three orthogonal coordinate axes of the spatial pointer reference frame.

11. The 3D pointing device of claim 10, wherein the data transmitting unit of the processing and transmitting module is attached to the PCB enclosed by the housing and transmits said first and second signal of the six-axis motion sensor module to the computing processor via electronic connections on the PCB.

12. The 3D pointing device of claim 10, wherein the computing processor of the processing and transmitting module is external to the housing and receives said first and second signal sets of the six-axis motion sensor module wirelessly from said data transmitting unit.

13. The 3D pointing device of claim 10, wherein the sensitivity input correlated to the display reference frame is predetermined by said mapping program of the computing processor of the processing and transmitting module utilizing boundary information of a display apparatus having a corresponding mapping area in said 2D-display reference frame and defined by a user input.

14. A method for obtaining a resulting deviation including resultant angles in a spatial pointer reference frame of a three-dimensional (3D) pointing device utilizing a six-axis motion sensor module therein and subject to movements and rotations in dynamic environments in said spatial pointer reference frame, comprising the steps of:

obtaining a previous state of the six-axis motion sensor module; wherein the previous state includes an initial-value set associated with previous angular velocities gained from the motion sensor signals of the six-axis motion sensor module at a previous time T−1;

obtaining a current state of the six-axis motion sensor module by obtaining measured angular velocities $\omega_x$, $\omega_y$, $\omega_z$ gained from the motion sensor signals of the six-axis motion sensor module at a current time T;

obtaining a measured state of the six-axis motion sensor module by obtaining measured axial accelerations Ax, Ay, Az gained from the motion sensor signals of the six-axis motion sensor module at the current time T and calculating predicted axial accelerations Ax', Ay', Az' based on the measured angular velocities $\omega_x$, $\omega_y$, $\omega_z$ of the current state of the six-axis motion sensor module without using any derivatives of the measured angular velocities ωx, ωy, ωz; said current state of the six-axis motion sensor module is a second quaternion with respect to said current time T; comparing the second quaternion in relation to the measured angular velocities $\omega_x$, $\omega_y$, $\omega_z$ of the current state at current time T with the measured axial accelerations Ax, Ay, Az and the predicted axial accelerations Ax', Ay', Az' also at current time T;

obtaining an updated state of the six-axis motion sensor module by comparing the current state with the measured state of the six-axis motion sensor module; and calculating and converting the updated state of the six axis motion sensor module to said resulting deviation comprising said resultant angles in said spatial pointer reference frame of the 3D pointing device.

15. The method for obtaining a resulting deviation of a 3D pointing device of claim 14, further comprises the step of outputting the updated state of the six-axis motion sensor module to the previous state of the six-axis motion sensor module; and wherein said resultant angles of the resulting deviation includes yaw, pitch and roll angles about each of three orthogonal coordinate axes of the spatial pointer reference frame.

16. The method for obtaining a resulting deviation of a 3D pointing device of claim 14, wherein said previous state of the six-axis motion sensor module is a first quaternion with respect to said previous time T−1; and said updated state of the six-axis motion sensor module is a third quaternion with respect to said current time T.

17. The method for obtaining a resulting deviation of 3D pointing device of claim 14, wherein the obtaining of said previous state of the six-axis motion sensor module further comprises initializing said initial-value set.

18. The method for obtaining a resulting deviation of 3D pointing device of claim 14, further comprises a mapping step comprising translating said angles of the resulting deviation in said spatial pointer reference frame to a movement pattern in a display reference frame; and the mapping step further comprises obtaining a sensitivity input correlated to said display reference frame different from said spatial pointer reference frame.

19. A method for obtaining a resulting deviation including resultant angles in a spatial pointer reference frame of a three-dimensional (3D) pointing device utilizing a six-axis motion sensor module therein and subject to movements and rotations in dynamic environments in said spatial pointer reference frame, comprising the steps of:

obtaining a previous state of the six-axis motion sensor module; wherein the previous state includes an initial-value set associated with previous angular velocities gained from the motion sensor signals of the six-axis motion sensor module at a previous time T−1;

obtaining a current state of the six-axis motion sensor module by obtaining measured angular velocities $\omega_x$, $\omega_y$, $\omega_z$ gained from the motion sensor signals of the six-axis motion sensor module at a current time T;

obtaining a measured state of the six-axis motion sensor module by obtaining measured axial accelerations $A_x$, $A_y$, $A_z$ gained from the motion sensor signals of the six-axis motion sensor module at the current time T and calculating predicted axial accelerations $A_{x'}$, $A_{y'}$, $A_{z'}$ based on the measured angular velocities $\omega_x$, $\omega_y$, $\omega_z$ of the current state of the six-axis motion sensor module without using any derivatives of the measured angular velocities $\omega_x$, $\omega_y$, $\omega_z$; said current state of the six-axis motion sensor module is a second quaternion with respect to said current time T; comparing the second quaternion in relation to the measured angular velocities $\omega_x$, $\omega_y$, $\omega_z$ of the current state at current time T with the measured axial accelerations Ax, Ay, Az and the predicted axial accelerations Ax', Ay', Az' also at current time T;

obtaining an updated state of the six-axis motion sensor module by comparing the current state with the measured state of the six-axis motion sensor module; and calculating and converting the updated state of the six axis motion sensor module to said resulting deviation comprising said resultant angles in said spatial pointer reference frame of the 3D pointing device.

* * * * *